H. T. HERR.
GEARED TURBINE.
APPLICATION FILED NOV. 14, 1916.

1,339,508.

Patented May 11, 1920.
4 SHEETS—SHEET 1.

INVENTOR.
Herbert T. Herr
BY Green & McCallister
HIS ATTORNEYS IN FACT.

H. T. HERR.
GEARED TURBINE.
APPLICATION FILED NOV. 14, 1916.
1,339,508.
Patented May 11, 1920.
4 SHEETS—SHEET 2.
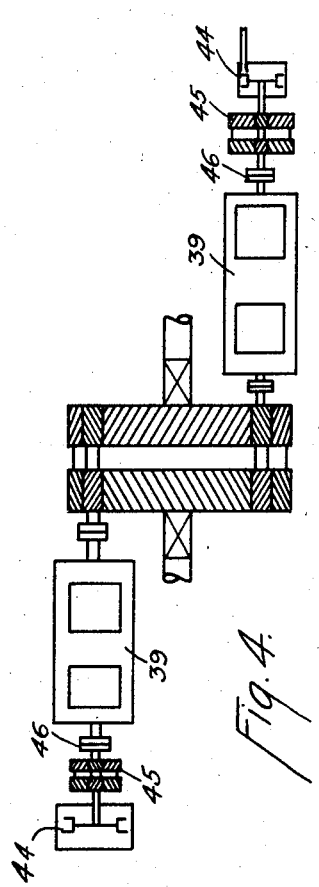
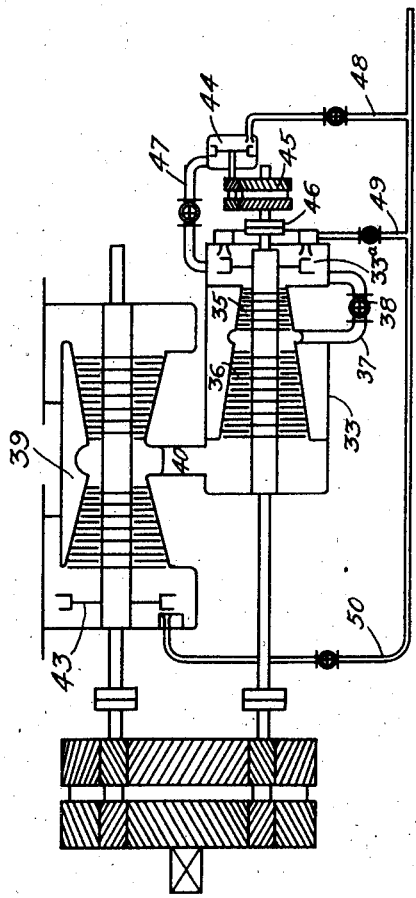
INVENTOR.
Herbert T. Herr
BY Green & McCallister,
HIS ATTORNEYS IN FACT H. T. HERR.
GEARED TURBINE.
APPLICATION FILED NOV. 14, 1916.
1,339,508.
Patented May 11, 1920.
4 SHEETS—SHEET 3.
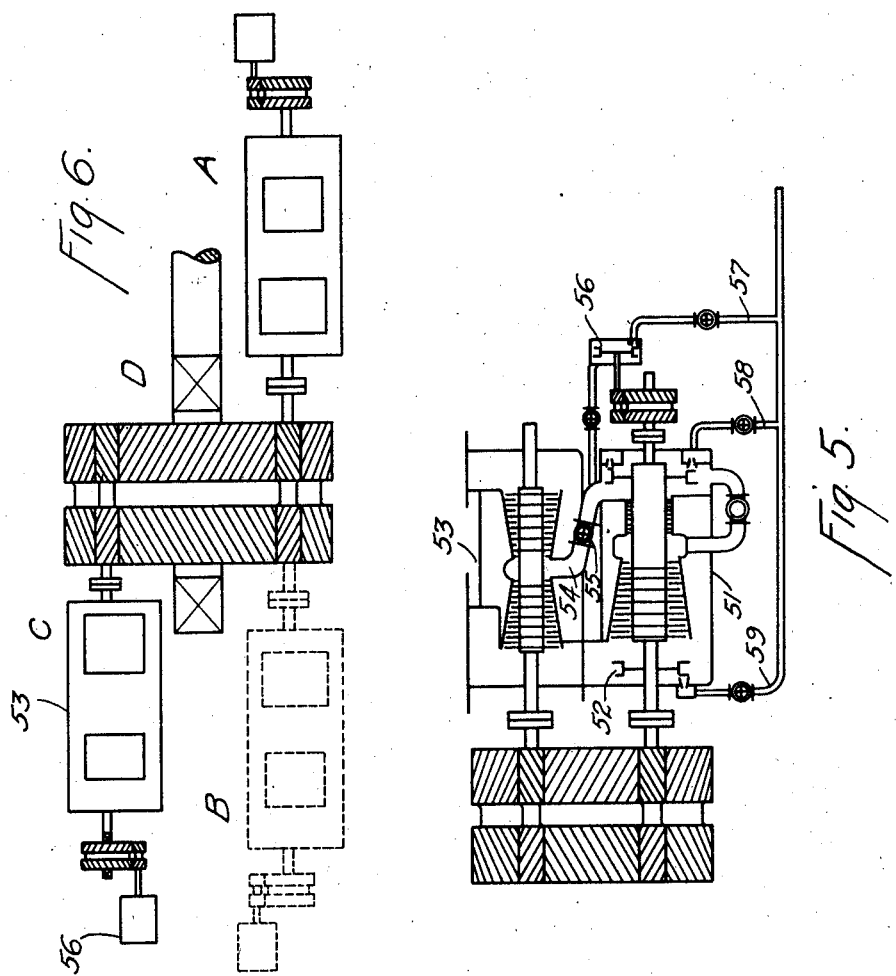
INVENTOR.
Herbert T. Herr
BY Green and McCallister
HIS ATTORNEYS IN FACT

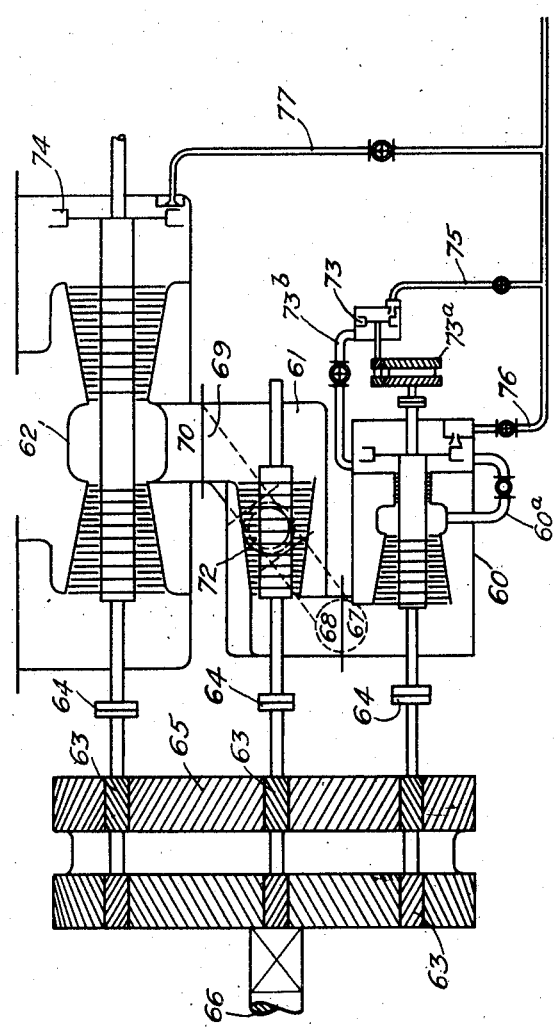

UNITED STATES PATENT OFFICE.

HERBERT T. HERR, OF PITTSBURGH, PENNSYLVANIA, ASSIGNOR TO WESTINGHOUSE ELECTRIC & MANUFACTURING COMPANY, A CORPORATION OF PENNSYLVANIA.

GEARED TURBINE.

1,339,508.  Specification of Letters Patent.  Patented May 11, 1920.

Application filed November 14, 1916. Serial No. 131,245.

*To all whom it may concern:*

Be it known that I, HERBERT T. HERR, a citizen of the United States, and a resident of Pittsburgh, in the county of Allegheny and State of Pennsylvania, have made a new and useful Invention in Geared Turbines, of which the following is a specification.

This invention relates to power developing apparatus and has for an object to produce a turbine especially adapted for marine service.

A further object is to produce a marine turbine which is more compact and lighter than turbines of the same capacity now in use and known to me.

A further object is to produce a geared turbine unit in which means are employed for compounding the separate turbine sections in various ways so as to obtain high economy over a wide range of speeds and loads.

These and other objects which will be made apparent throughout the further description of my invention are attained by means of apparatus embodying the features herein described and illustrated in the drawings accompanying and forming a part hereof.

In the drawings: Figure 1 is a diagrammatic sectional elevation of one embodiment of my invention.

Fig. 3 is a diagrammatic sectional elevation of another embodiment of my invention.

Fig. 4 is a diagrammatic plan view illustrating an arrangement of turbines which may be employed with a single reduction gearing.

Fig. 5 is a diagrammatic sectional elevation of a further modification of my invention.

Fig. 6 is a diagrammatic plan view, similar to Fig. 4, but illustrating an installation including turbine units such as are illustrated in Fig. 5.

Fig. 7 is a diagrammatic sectional elevation of a more complex embodiment of my invention.

In marine installations the space available for power developing apparatus is often limited and for that reason it is desirable to develop as much power per unit of engine room space as is possible. It is therefore customary to employ relatively high speed turbines for ship propulsion. It is ordinarily not feasible to drive the ship's propellers at turbine speeds, consequently some means, such as reduction gearings are ordinarily interposed between the turbine or turbines and the propeller shafts. In turbines developing large power it is often desirable to divide the turbine into separate sections. Where gears are employed this is more or less essential for the purpose of reducing the power transmitted by each pinion. The division of the turbine into separate sections has necessitated the use of a relatively large number of reduction gearings and consequently has increased the cost, if not the weight, of marine installations.

One of the objects of my present invention is to produce a turbine installation having all of the desirable features resulting from the division of the turbine into sections, but in which the disadvantages, resulting from the necessity of employing a relatively large number of separate reduction gearings are eliminated.

A further object is to produce a turbine unit, having the advantages above described, and in which means are employed for so compounding the separate sections that the unit will operate with high economy throughout a wide range of speeds.

A further object is to produce a turbine installation in which means are employed for reversing the driven agents or the ship's propellers without materially adding to the cost or to the weight of the power developing apparatus.

Figure 1:
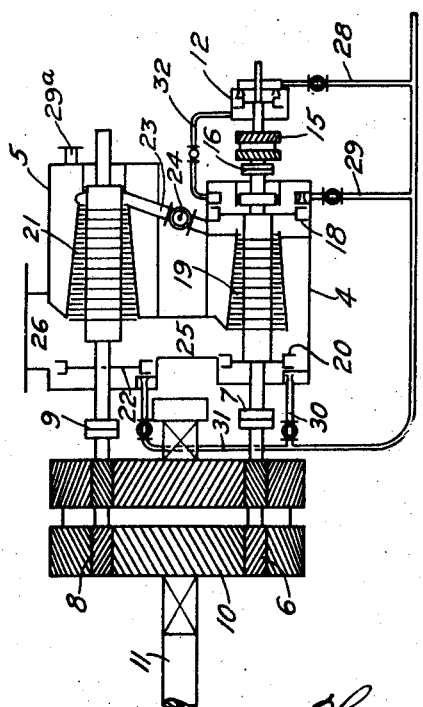

In Fig. 1, I have illustrated a turbine unit including a number of separate sections and so arranged that all the sections are adapted to transmit power to a single gear of a reduction gearing and so arranged that two such units may be employed in connection with a single reduction gearing. As illustrated, the unit includes a turbine section 4 and a turbine section 5 located above the section 4, or in such a position with relation to the section 4 that each of the sections may drive separate pinions which mesh with a common driven gear. The unit also includes a cruising turbine or section 12, which may under certain conditions of speed, be connected in series, with relation to the flow of motive fluid, with one of the other sections of the unit. As shown, the section 12 is operatively connected to the rotor element of the section 4 by means of a reduction gearing and a coupling 16. The reduction gearing is illustrated as including the pinion 14 operatively connected to the rotor of the section 12, and a driven gear 15 which is operatively connected to the rotor of the section 4 by means of the clutch 16.

As shown, the section 4 may be termed the high pressure or initial section, since under full power conditions it is adapted to receive high pressure motive fluid, hereinafter termed steam, and to deliver partially expanded steam to the section 5, which may therefore be termed the low pressure section of the unit. It will, of course, be understood that Fig. 1 is merely illustrative of the invention and that the sections 4 and 5 may occupy different relative positions. For example, the section 4 may be located above the section 5 if the exhaust connections are such as to render this arrangement desirable.

As illustrated, the section 4 is provided with an initial working element 18, which is shown as consisting of two rows of impulse blades mounted on a blade carrying wheel, and one or more coöperating nozzles. In the illustrated arrangement, the working element 18 may be termed the initial stage, although it will be apparent that the section 4 may be provided with one or more such elements or stages. As illustrated, the initial stage receives high pressure steam through a pipe or passage 29, which communicates with the nozzle or nozzles of that stage. The nozzles partially expand the motive fluid and deliver it at a high velocity to the blades included in the stage. The rotating blades abstract the kinetic or velocity energy of the steam in the usual manner, and the steam issuing therefrom is, under certain operating conditions, divided into two streams, one of which is delivered to the low pressure elements or stages 19 of the section 4, and the other of which is delivered through a pipe or passage 23 to the low pressure elements or stages 21 of the section 5. The passage 23 is provided with a valve 24 so that the steam supplied to the section 5 may be cut off under certain operating conditions.

As illustrated, the low pressure elements of both the sections 4 and 5 are of that type in which a single row of moving blades is employed in each stage. By the term stage I mean coöperating turbine elements which expand the motive fluid and then abstract substantially all of the velocity energy resulting from the expansion. I desire it to be understood, however, that the low pressure elements of both the sections 4 and 5 may be of any type.

The elements 19 of the section 4 are adapted to discharge the steam into an exhaust chamber formed within the casing of the section 4 and which, as illustrated, communicates with a similar exhaust chamber formed within the casing of the section 5. A passage 25 is employed for establishing communication between these exhaust chambers and the casing of the section 5 is provided with an exhaust port 26 which, in the apparatus illustrated, serves both the sections. The steam delivered to the section 5 through the passage 23 is expanded to exhaust pressure by the low pressure elements 21. With this arrangement the low pressure elements of both the sections 4 and 5 operate on the same range of expansion, and they both expand the steam to exhaust pressure.

The cruising section 12 is illustrated as a single impulse stage, but it will be apparent that this section may include one or more stages and that while impulse stages are preferable, since their use decreases the size of the cruising section, other types of turbine elements may be employed.

Each section 4 and 5 is provided with a separate reversing element. The reversing element of the section 4 is illustrated as a single impulse stage 20, which receives high pressure steam through a pipe or passage 30. The reversing element of the section 5 is illustrated as a single impulse stage 22 which receives steam through a branch pipe or passage 31. These reversing stages or elements are located in the exhaust chambers of their respective sections and are served by the exhaust port 26. It will, of course, be apparent that the reversing sections may be of any type, that they may employ one or more stages and that the steam passages may be so arranged that the reversing elements of the different sections may if desired be operated in series.

As illustrated, the section 4 is operatively connected to a pinion 6 by means of a clutch or coupling 7. The pinion 6 meshes with the main gear 10 of the main reduction gearing. The gear 10 may be mounted on or operatively connected to a propeller shaft 11. The section 5 is illustrated as operatively connected to a pinion 8 by means of a clutch or coupling 9, and the pinion 8 also meshes with the main gear 10 of the main reduction gearing. By mounting the sections 4 and 5 one above the other, both the pinions 6 and 8 are located on the same side of the gear 10 and it is possible to employ an additional unit for transmitting power to the gear 10.

Figure 2:
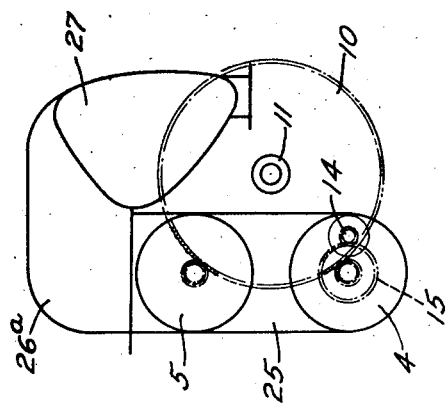
Fig. 2 is a diagrammatic end view of the apparatus shown in Fig. 1.

As illustrated in Fig. 2, a condenser 27 communicates with the port 26 through a discharge pipe or passage 26ª. The condenser is shown located above the axis of the main gear 10 and on the opposite side of the axis from the unit which it serves.

Under full power and high speed conditions high pressure steam is delivered to the section 4 through the passage 29, the valve 24 in the passage 23 is open, and the sections 4 and 5 operate in a manner previously described. Under low power and low speed conditions, the supply of steam to the section 4, through the passage 29, is cut off and high pressure steam is delivered to the cruising section 12 through the passage 28. The steam after having done work in the section 12 is delivered to the section 4 through the passage 32 and is completely expanded by that section, the valve 24 being closed. It will also be apparent that at intermediate speeds the valve 24 may be open so as to render the section 5 operative, or that the section 12 may be rendered inoperative by closing off its steam supply, the valve 24 may be closed and high pressure steam may be delivered only to the section 4. It will, of course, be understood that some means, such for example as nozzle control, may be employed in connection with the section 4, for the purpose of proportioning the delivery of steam to the section in accordance with the power to be transmitted. With the arrangement of apparatus illustrated in Figs. 1 and 2, the inoperative sections may be uncoupled and may therefore stand idle. In case of an accident to the section 4, I may deliver high pressure steam directly to the section 5 through the inlet passage 29ª.

While the reversing elements are in operation, the steam supplied to the ahead sections is, of course, cut off. The reversing elements 20 and 22 may each receive high pressure steam, or one or the other may be rendered inoperative, or the steam delivered to one reversing element may be partially expanded therein and then delivered to the other element. It will, of course, be understood that the drawings forming a part hereof are merely illustrative of the invention and that details of construction having no direct bearing on the invention have been omitted for the sake of simplicity and for convenience of illustration.

In Fig. 3, I have illustrated a modified form of apparatus embodying the invention. Fig. 3 discloses a turbine unit including a section 33, which may be termed the initial or high pressure section, and a section 39 which may be termed the low pressure section. It also includes a cruising section 44 similar to the section 12 previously described. The cruising section is shown operatively connected to the rotor element of the section 33 by means of reduction gearing 45 and a clutch or coupling 46, and the rotor elements of each of the sections 33 and 39 are operatively connected to separate pinions which mesh with a common gear of the main reduction gearing.

As illustrated, the section 33 includes what may be termed an initial stage 33ª, which is similar to the stage 18 of Fig. 1. It also includes intermediate pressure elements 35 and low pressure elements 36, both of which are adapted to operate in series with the element 33ª. The steam delivered from the section 33 or from the elements 36 is only partially expanded and is delivered to the inlet passage 40 of the low pressure section 39. The low pressure section is illustrated as a double flow section, i. e., one in which the steam is divided into two streams, each of which is passed through a separate working passage. I have also shown a bypass 37 for bypassing steam discharged from the initial element 33ª around the element 35. This bypass is provided with a valve 38.

High pressure steam is delivered to the cruising section 44 through a valved passage 48 and high pressure steam is delivered to delivery nozzles of the elements 33ª through a valved pipe or passage 49. A reversing element 43 is shown within the casing of the section 39 and located within one of the exhaust chambers of that section. High pressure steam may be delivered to this element through a valved pipe or passage 50.

Under full power, full speed conditions the supply of motive fluid to the cruising section is cut off and the valve in the passage 47 is preferably closed. Steam is delivered to the section 33 through the passage 49 and the valve 38 in the bypass 37 is opened. Steam issuing from the element 33ª is therefore bypassed around the intermediate pressure elements 35 and is, in effect, delivered directly to the elements 36, where it is further expanded in doing work and from which it is delivered to the low pressure elements of the section 39. While the turbine is operating at intermediate speeds, the bypass valve 38 is closed. This causes the elements 35 to operate in series with the elements 33ª and 36 and to increase the number of working elements employed in expanding the steam. The elements 35 may, therefore, be termed cruising elements, since they are only employed while the turbine is developing reduced power and operating at reduced speed.

Under low speed conditions, the steam supply to the section 33 through the passage 49, is cut off and high pressure steam is delivered to the cruising section 44. This steam after having been partially expanded in doing work within the section 44 is delivered through the passage 47 to the inlet of the elements 35. If the valve 38 in the bypass 37 is closed, the elements 35 and 36 will operate in series on the steam discharged from the section 44. If, however, the bypass is open, the elements 35 will be rendered inoperative as power developing agents, and the steam discharged from the section 44 will, in effect, be delivered directly to the inlet of the elements 36. Under such conditions the steam discharged from the elements 36 will be delivered to the low pressure section 39, as previously described.

In Fig. 4, I have illustrated in plan view an arrangement of units which may be employed in connection with a single reduction gearing. It will be apparent that this arrangement may be employed in connection with apparatus such as is illustrated in Figs. 1, 2 and 3, or in connection with units of any type falling within the terms of the invention.

In Fig. 5, I have illustrated a turbine unit including a section 51, a section 52 and a cruising section 56. The section 51 is similar to the section 33 of Fig. 3, except that it is adapted to expand motive fluid to exhaust pressure. The section 53 is similar to the section 39 of Fig. 3, except that it is adapted to receive a portion of the steam discharged from an initial stage or element of the section 51. A passage 54, provided with a valve 55, is employed for this purpose and, as shown, communicates at its inlet end with the discharge chamber of the initial stage of the section 51 and at its outlet with the inlet port of the section 53. In addition to this the initial section 51 is provided with a reversing section 52, which receives steam through a valve passage 59. High pressure steam is delivered to the section 51 through a valve passage 58, to the cruising section 56 through a valve passage 57. In this view, as in the views previously described, the initial and low pressure sections mutually support each other, the low pressure section being shown located above the high pressure section.

In Fig. 6, I have illustrated in full lines an arrangement of turbine units which may be employed in connection with a single reduction gearing, and in dotted lines I have illustrated an alternative arrangement which may be employed where space conditions necessitate a rearrangement of the elements. Where the dotted line construction is employed, the turbine unit A will be replaced by the turbine unit B, which will operate in conjunction with the turbine unit C in transmitting power to the reduction gearing D. This arrangement of turbine units may be employed in connection with the apparatus illustrated in either Figs. 1, 3, 5 or 7, and where it is employed the condenser will preferably be located as illustrated in Fig. 2, unless of course, the low pressure section is located below the initial section, in which case the condenser will be located below the axis of the large gear of the main reduction gearing.

In Fig. 7, I have illustrated a further modification of my invention. The turbine unit there illustrated includes an initial section 60, an intermediate section 61, and a low pressure section 62. Each of these sections is operatively connected to a separate pinion 63 by means of a separate coupling 64, and the pinions all mesh with the same gear 65, which may be mounted on or be operatively connected to a propeller shaft 66. As illustrated, the initial section 60 is similar to the section 33 of Fig. 3 and includes an initial stage, which is adapted to receive high pressure steam through a valve passage 76. The section also includes cruising elements similar to the elements 35 of Fig. 3 and a set of elements or stages similar to the stages 36 of Fig. 3. Under full speed, full power conditions motive fluid discharged from the section 60 is delivered to the working elements of the section 61, from which it is delivered to the working elements of the section 62. While the section 62 is illustrated as a double flow section, it will be apparent that it may be a single flow section, such as illustrated in Fig. 1. The unit also includes a cruising section 73, which is operatively connected to the rotor of the section 60 by means of a reduction gearing 73$^a$ and which receives motive fluid from a valved passage 75. The fluid discharged from the section 73 is adapted to be delivered to the section 60 through a valved passage 73$^b$. The passage 73$^b$ may deliver motive fluid traversing it to nozzles forming a part of the initial stage of the section 60, as illustrated in Fig. 1, or it may deliver the motive fluid to the discharge chamber of that stage, as described in connection with the apparatus illustrated in Fig. 3. Under reduced power conditions, steam is delivered to the cruising section, the valve in the passage 76 being closed, and the valve in the bypass 60$^a$ being open. Under some conditions of power and speed it may be desirable to render the section 61 inoperative, in which case I provide a bypass 69 which communicates with the exhaust chamber 67 of the section 60 through a port 68 and which also communicates with the inlet port 70 of the section 62. With the bypass 69 open, steam delivered from the section 60 will pass to the section 62 without doing work in the section 61 and consequently the clutch 64 and the pinion driven by the section 61 may be open, so that the section may stand idle. With this arrangement of apparatus various combinations of sections and elements may be obtained and consequently the turbine unit may operate efficiently throughout a wide range of speeds.

In Fig. 7, I have illustrated the section 61 located above the section 60 and the section 62 located above the section 61, so that a triple deck construction is approximated. It will, of course, be apparent that the section 62 may be located below the sections 60 and 61 and that the relative positions of the sections may be varied so long as they are so arranged that their pinions are capable of meshing with the gear 65. I have illustrated a reversing element 74 located in one of the exhaust chambers of the section 62. This element receives high pressure steam through a valved passage 77 and is diagrammatically illustrated as a single impulse stage. It will, of course, be apparent that each of the sections 60 and 61 may also be provided with reversing elements, that the section 62 may be provided with two reversing elements, one located in each exhaust chamber, and that all of the reversing elements may be adapted to receive high pressure steam, or that they may be combined either in series or in divided flow relation. For example, steam may be delivered to the reversing element of the section 60 and it may then pass in series through the reversing elements of the sections 61 and 62, or it may be divided into two streams and passed in parallel through the reversing elements of the sections 61 and 62.

While I have described several embodiments of my invention, it will be apparent that other and various arrangements of turbines or turbine sections may be employed without departing from the spirit and scope of the invention, as set forth by the appended claims.

What I claim is:

1. In combination in a marine turbine installation, an initial section including a high pressure stage, an intermediate pressure stage and a valved by-pass for by-passing fluid delivered from the initial stage around the intermediate stage, a low pressure section adapted to receive steam from the initial section, and a cruising section geared to the shaft of the initial section and adapted to deliver partially expanded steam to that portion of the initial section communicating with the inlet to said valved by-pass passage.

2. In a marine turbine, an initial section including a high pressure stage, and intermediate pressure elements, a valved bypass for bypassing fluid discharged from the initial stage around one of said intermediate pressure elements, and a low pressure section receiving fluid discharged from the initial section, in combination with a cruising section, a reduction gearing between the cruising section and the initial section, and a passage between said cruising section and the initial section for delivering partially expanded fluid from the cruising section to a portion of the initial section communicating with the inlet to said bypass passage.

3. In combination in a marine turbine installation, an initial section having a valved by-pass passage for by-passing fluid around a working element of said section, a low pressure section receiving motive fluid from the initial section, and a cruising section adapted to deliver partially expanded motive fluid to that portion of the initial section communicating with the inlet to the by-pass passage.

4. In combination in a marine turbine installation, an initial section including a high pressure element and low pressure elements for expanding motive fluid to exhaust pressure, a low pressure section for expanding motive fluid to exhaust pressure, a passage communicating with the inlet of the low pressure section and with an intermediate portion of the working passage of the initial section between the high pressure element and the exhaust of that section, a valve in said passage, a cruising turbine geared to the shaft of one of said sections and adapted to exhaust into said passage on the initial section side of said valve whereby motive fluid exhausted from said cruising turbine may pass to the initial or low pressure sections.

5. In combination in a marine turbine installation, an initial section having a valved by-pass passage for by-passing fluid around a portion of the working passage of said section, a low pressure section, a passage communicating with the inlet to the low pressure section and with that portion of the working passage of the initial section which communicates with the inlet of the by-pass passage, a cruising turbine geared to the shaft of one of the turbine sections, and an exhaust passage for the cruising turbine communicating with that portion of the initial section which communicates with the by-pass.

6. In combination in a marine turbine installation, an initial section geared to the propeller shaft, a secondary section geared to the propeller shaft, and adapted to receive partially expanded motive fluid from the initial section, and a cruising turbine geared to one of said sections, and an exhaust passage for the cruising turbine so arranged that the cruising turbine may exhaust into the working passage of the initial or secondary section.

7. In combination in a marine turbine installation, an initial turbine element, an intermediate turbine element, and a low pressure turbine element, adapted to operate in series, and geared to the propeller shaft, a cruising turbine geared to one of said elements and adapted to exhaust into a working passage intermediate the initial element and the low pressure element, and means for by-passing the intermediate element.

In testimony whereof, I have hereunto subscribed my name this 8th day of November, 1916.

HERBERT T. HERR.